United States Patent [19]
Earleson

[11] Patent Number: 6,112,719
[45] Date of Patent: Sep. 5, 2000

[54] ACCELERATION BASED CONTROL SYSTEM FOR SPEED GOVERNING

[75] Inventor: Walter E. Earleson, Morton, Ill.

[73] Assignee: Caterpillar Inc., Peoria, Ill.

[21] Appl. No.: 09/212,058

[22] Filed: Dec. 15, 1998

[51] Int. Cl.$^7$ .................................................. F02D 41/14
[52] U.S. Cl. ........................ 123/352; 123/357; 701/110
[58] Field of Search ........................... 123/27 GE, 352, 123/357, 478, 526; 69/39.281; 180/176, 179; 318/560; 701/110

[56] References Cited

U.S. PATENT DOCUMENTS

| | | | |
|---|---|---|---|
| Re. 36,470 | 12/1999 | Woll et al. | 342/71 |
| 4,423,593 | 1/1984 | Zagranski et al. | 60/39.281 X |
| 4,498,016 | 2/1985 | Earleson et al. | 290/40 R |
| 4,860,210 | 8/1989 | McCombie | 123/352 X |
| 4,890,231 | 12/1989 | Frantz | 701/110 X |
| 5,040,119 | 8/1991 | Hardy et al. | 701/50 |
| 5,256,951 | 10/1993 | Nashiki et al. | 318/575 |
| 5,361,579 | 11/1994 | Bachelder | 60/39.281 |
| 5,364,321 | 11/1994 | Togai et al. | 477/42 |
| 5,625,558 | 4/1997 | Togai et al. | 701/93 |

FOREIGN PATENT DOCUMENTS 0467 353 A1  1/1992  European Pat. Off. .

*Primary Examiner*—Tony M. Argenbright
*Attorney, Agent, or Firm*—Haverstock Garrett & Roberts

[57] ABSTRACT

In one embodiment, the present invention is a method for governing the speed of a device that involves generating a command signal based on a desired change in acceleration, the inertia of the device, and a load associated with the device. The command signal is output to actuating means for changing the acceleration of the device. A speed sensor provides a signal indicative of the speed of the device such as an engine, a movable machine, or a movable component of a machine. An error signal based on the difference between the actual speed of the device and the desired speed of the device is calculated. The desired change in acceleration is computed based on the error signal and a gain factor that is proportional to a desired response time of the control system. The desired change in acceleration is multiplied by an inertial gain factor that is derived from a previous command signal and the change in the speed of the device that resulted from a previous command signal. The inertial gain factor is computed and updated at selected intervals to account for changes in the inertia and load.

25 Claims, 6 Drawing Sheets

ACCELERATION BASED CONTROL SYSTEM FOR SPEED GOVERNING

TECHNICAL FIELD

This invention relates generally to speed control systems and, more particularly, to an engine control system that generates a command signal based on a desired change in acceleration and the change in speed achieved by a previous command signal.

BACKGROUND ART

Various types of microprocessor-based electronic control systems for governing the speed of an engine are well known in the art. These control systems typically calculate a speed error signal based on the difference between the desired speed of the crankshaft of an engine and the actual speed of the engine crankshaft. The speed error signal is input to a controller that converts the speed error signal to a command signal. The command signal is input to an actuating device to change the engine's operating state so that the actual speed of the engine approaches the desired speed of the engine. An example of a command signal is commanded fuel valve position that is used to control the amount of fuel injected per cycle in a diesel engine. A change in the fuel delivered to the engine will cause the speed of the engine's crankshaft to accelerate or decelerate, thereby causing a change in engine speed. The magnitude and rate of change of engine crankshaft speed is a function of the engine's dynamics including the engine's inertia, the inertia of the load, and the load on the engine. The controllers have one or more gain factors associated with them to convert the engine speed error signal to the desired command signal and to achieve the desired response characteristics. In the prior art, the gain factors are selected for each system using control system analysis techniques and/or simulation models. The value selected for a gain factor may be a constant or a function of one or more variables.

Another type of speed governing system is a cruise control system that is used to control the speed of a mobile machine that is powered by an engine. A sensor provides a signal indicative of the traveling speed of the machine, such as an automobile. A desired traveling speed is set by an operator. A machine speed error signal based on the difference between the desired traveling speed and the sensed traveling speed is converted to a desired engine speed signal. This signal is input to the engine speed control system to change the speed of the engine, thereby indirectly changing the speed of the mobile machine. A gain factor that is a constant or a function of one or more variables is used to convert the machine speed error to a commanded engine speed. The gain factor is selected to achieve the desired dynamic response for the engine/machine combination.

As electronic control systems become more widely used across engines and other propulsion systems, it is desired to have an electronic control system that is independent of a particular system's dynamics. The control system would then be usable with a variety of propulsion system platforms without having to determine gain factors for a given engine or engine/machine combination. It is also desired to use such a control system to control the speed of the engine as well as the speed of vehicles and machinery that are powered by the engine.

DISCLOSURE OF THE INVENTION

In one embodiment, the present invention is a method for governing the speed of a device that involves generating a command signal based on a desired change in acceleration, the inertia of the device, and a load associated with the device. The command signal is output to actuating means for changing the acceleration of the device. A speed sensor provides a signal indicative of the speed of the device such as an engine, a movable machine, or a movable component of a machine. An error signal based on the difference between the actual speed of the device and the desired speed of the device is calculated. The desired change in acceleration is computed based on the error signal and a gain factor that is proportional to a desired response time of the control system. The desired change in acceleration is multiplied by an inertial gain factor that is derived from a previous command signal and the change in the speed of the device that resulted from a previous command signal. The inertial gain factor is computed and updated at selected intervals to account for changes in the inertia and load.

BEST MODE FOR CARRYING OUT THE INVENTION

Figure 1:
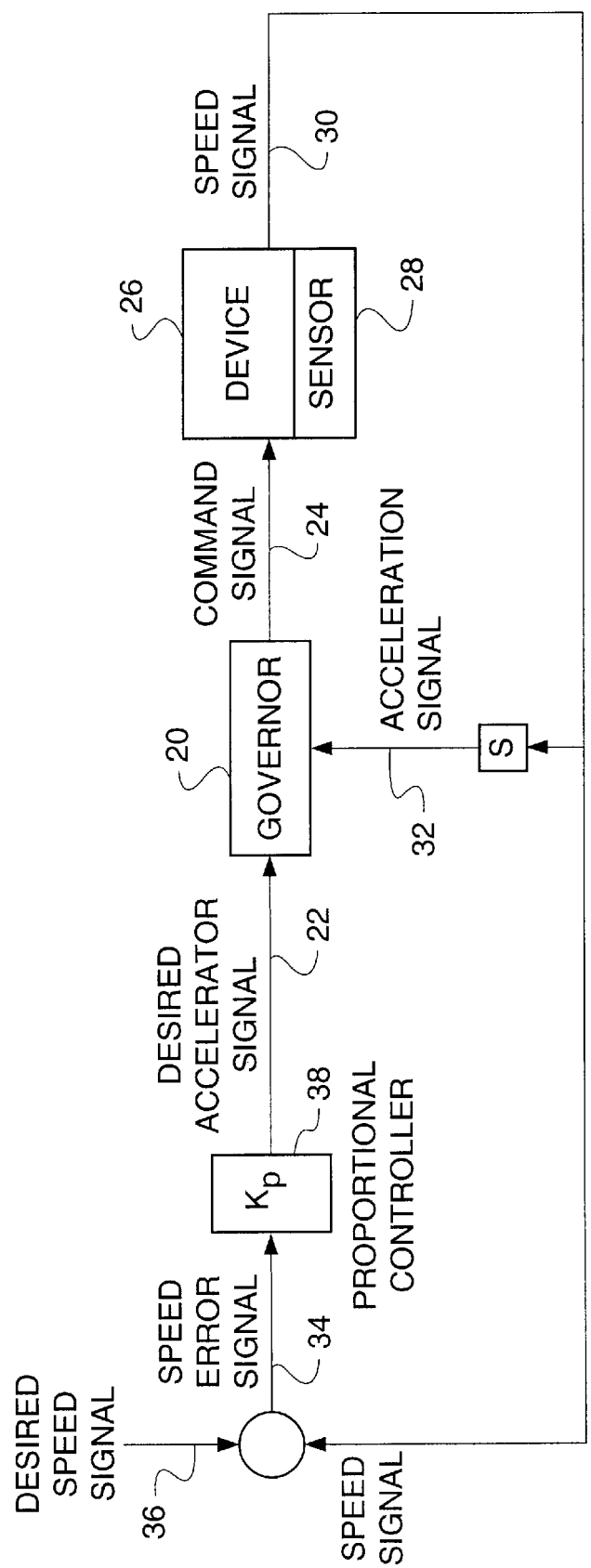
FIG. 1 is a functional block diagram of a speed control system incorporating the present acceleration based speed governor.

Referring now to FIG. 1, a functional block diagram of components of a preferred embodiment of the present invention for controlling the speed of a device including governor 20 receiving desired acceleration signal 22 and outputting command signal 24 to device 26 is shown.

Sensor 28 is connected to device 26 for providing speed signal 30 indicative of the speed of device 26. Acceleration signal 32 is calculated by taking the derivative of speed signal 30. Speed error signal 34 is computed by taking the difference between desired speed signal 36 and speed signal 30. The desired speed signal 36 may be a predetermined constant, a variable based on a function or data table, and/or an input from an operator or other control system such as a cruise control system. Speed error signal 34 is converted to desired acceleration signal 22 using a proportional controller 38 as is well known in the art. The value for gain factor $K_p$ is selected to provide the desired time response for changes in the speed of device 26. A value for $K_p$ that is less than the number one provides a faster time response than a value of $K_p$ that is greater than or equal to the number one. $K_p$ may be a constant value or it may be a function of one or more variables, depending on the device's range of operating conditions and the time response desired throughout various portions of the operating range.

Device 26 is any type of movable machine or movable component of a machine for which speed control is desired including, for example, the crankshaft of a diesel, gasoline, or dual fuel engine, or a movable machine powered by an engine. Other examples of device 26 include a manipulator arm on a robot, and a work implement on construction or agricultural equipment. The above-named devices are illustrative of the types of devices with which the present invention for governor 20 may be used and is not intended to limit application of governor 20.

Sensor 28 may be any type of electronic or mechanical sensor that is operable to provide a signal or measurement indicative of the speed of device 26. The direction of movement of device 26 may be rotational, linear, or a combination of rotational and linear movement. Sensor 28 should therefore be selected to provide desired information regarding the speed of device 26. Many such sensors 28 for providing signals indicative of rotational and/or linear speed are well known and commercially available. An example of a sensor for sensing the speed of an engine crankshaft is a timing wheel (not shown) having a Hall effect switch that is triggered by spaced teeth on a timing wheel.

Figure 2:
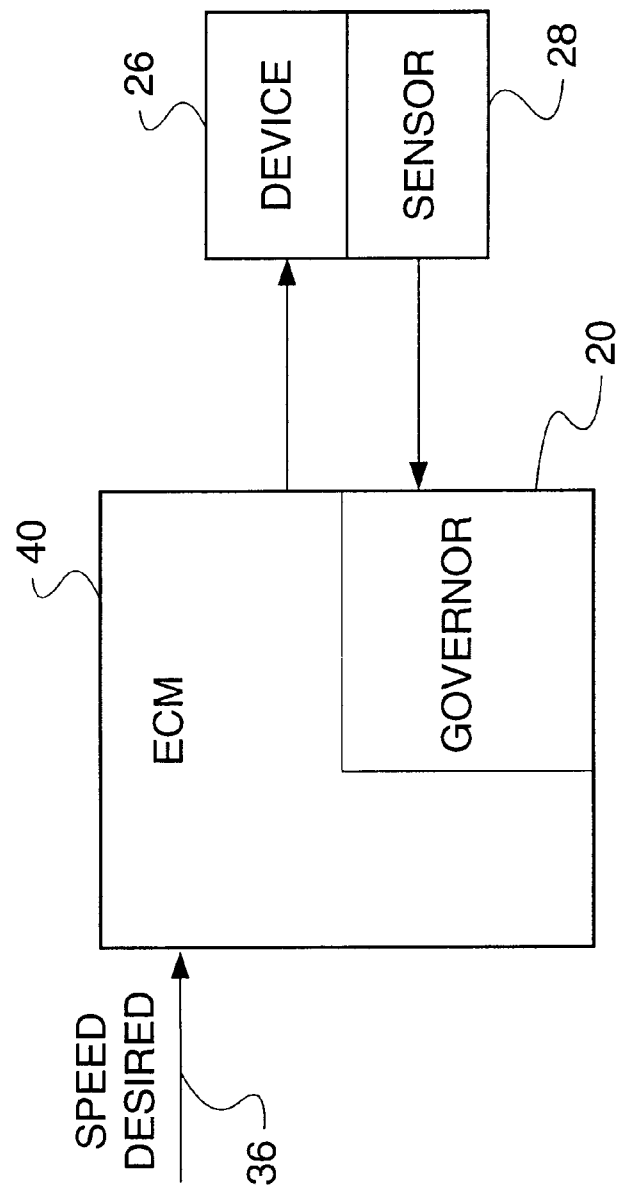
FIG. 2 is a functional block diagram of the interface between the governor, a device, a sensor, an electronic controller, and input to the electronic controller.

FIG. 2 shows governor 20 as part of electronic control module (ECM) 40, which may be implemented in hardware, software, or a combination of hardware and software in a computer system. Such a computer system may include a microprocessor connected to one or more memory devices and input/output devices for interfacing with device 26, sensor 28 and for receiving inputs such as desired speed signal 36, as is well known in the art. The ECM 40 may perform control functions in addition to performing the functions of governor 20, including receiving inputs, and transmitting outputs. Alternatively, governor 20 may reside in a computer system outside of ECM 40. In this situation, an input/output data link between ECM 40 and governor 20 is required.

Figure 3:
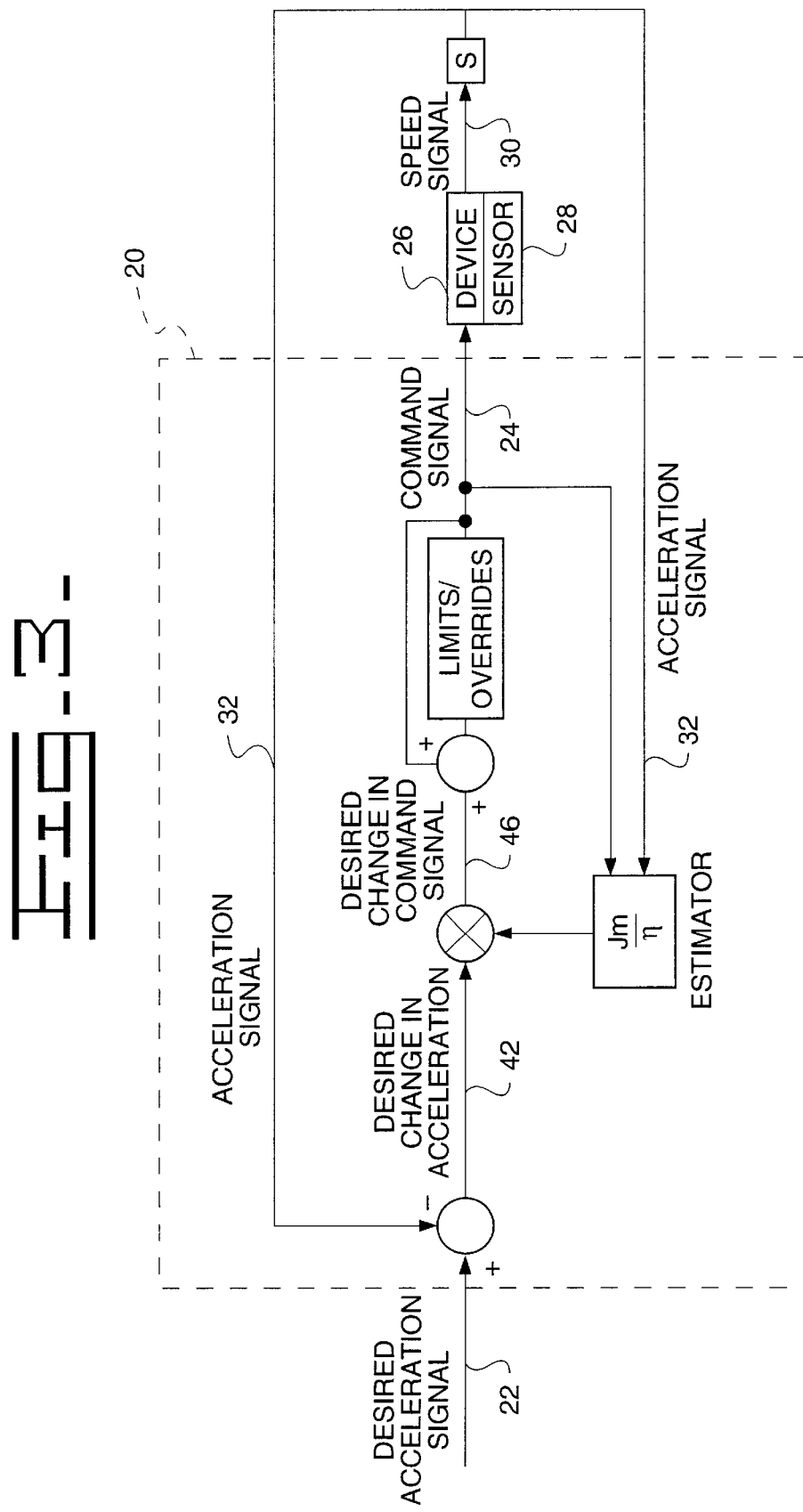
FIG. 3 is a functional block diagram of the present acceleration based speed governor.

FIG. 3 shows a block diagram of a preferred embodiment of an acceleration based speed governor for controlling the speed of device 26. Sensor 28 provides a signal indicative of the speed of device 26. Calculations required to implement the present invention may be implemented in data processing means such as one or more computer systems as discussed hereinabove. As shown in FIG. 3, a desired change in acceleration signal 22 is determined by calculating the difference between desired acceleration signal 22 and acceleration signal 32. Sensor 28 provides speed signal 30 indicative of the speed of device 26. In order to provide acceleration signal 32 to governor 20, the derivative of speed signal 30 is computed (represented by Laplace transform symbol s in FIGS. 1, 3, 5, and 6) using one of several numerical techniques for differentiation known in the art. Alternatively, sensor 28 may include one or more sensors that provide signals indicative of acceleration as well as speed of device 26. Further, acceleration signals may be integrated using one of several known numerical integration methods to provide speed signal 30, instead of or as a backup to using a speed sensor.

FIG. 3 shows a functional block diagram of governor 20 wherein a desired change in command signal 46 is calculated based on the product of desired change in acceleration 42 and inertial gain factor $J_m/\eta$. One of the important aspects of the present invention is the use of knowledge, or past values, of the change in the speed of device 26 that resulted from a previous change in command signal 24. This knowledge is used to compute inertial gain factor $J_m/\eta$ at selected intervals according to an equation that is derived beginning with the assertion that acceleration of device 26 is a function of torque as defined by the following equation:

$$\alpha = (C^*\eta - T)/J_m$$

Where:
- $\alpha$=acceleration signal 32
- C=command signal 24
- $\eta$=efficiency in converting command signal 24 to torque
- T=torque applied to a load
- $J_m$=moment of inertia of device 26

A change in acceleration between subsequent passes is therefore equal to:

$$\Delta\alpha = \alpha_i - \alpha_{i-1} = (C_i^*\eta - T_i)/J_m - (C_{i-1}^*\eta - T_{i-1})/J_m$$

where subscript i denotes the last pass and subscript i−1 denotes the second last pass. Assuming negligible change between $T_i$ and $T_{i-1}$ due to a small time slice between subsequent data processing cycles with a digital computer system, the equation reduces to:

$$\Delta\alpha = \eta^*(C_i - C_{i-1})/J_m = \eta^*\Delta C/J_m$$

Therefore, $$\Delta C = \Delta\alpha^* J_m/\eta$$

and $$J_m/\eta = \Delta C/\Delta\alpha$$

An estimate of inertia over conversion efficiency ($J_m/\eta$) is thus computed using values of C and $\alpha$ from previous data processing cycles. The desired change in command signal 46 for the present pass is then computed by multiplying the desired change in acceleration 42 by the estimate for $J_m/\eta$, as shown in FIG. 3. The command signal 24 is computed by summing the desired change in command signal 46 with the command signal 24 which is then compared against operating conditions of the device 26. For example, the device 26 may have certain operating limits or overrides such as temperature, emissions, or torque limits. If it is determined after the summation of the signals 24 and 46 that the resultant signal is for some reason not with the operating conditions established for the device 26 then the resultant signal will be altered or corrected to be within the operating conditions for the device 26. Command signal 24 is output to actuating means associated with or part of the device 26 for changing the speed of the device 26.

Figure 4:
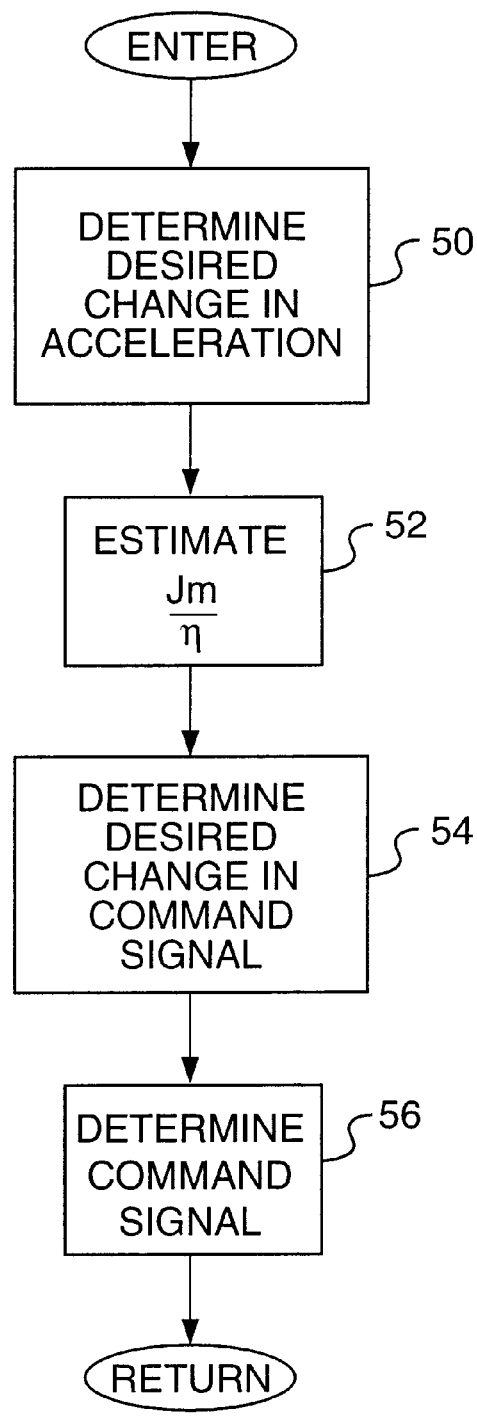
FIG. 4 is a flowchart representation of the steps associated with the method of the present invention for controlling speed based on acceleration.

FIG. 4 shows a flowchart of the method of the present invention wherein Block 50 shows the step of determining desired change in acceleration signal 42 based on the difference between desired acceleration signal 22 and acceleration signal 32. Block 52 shows the step of estimating inertial gain factor $J_m/\eta$ based on previous values for command signal 24 and acceleration signal 32. The next step, shown in Block 54, is calculating a desired change in the command signal 46 by multiplying the desired change in acceleration signal 42 by inertial gain factor $J_m/\eta$. In Block 56, command signal 24 is determined by summing the desired change in command signal 46 and the command signal 24 with the resultant signal being compared against operating conditions established for the device 26. The command signal 24 is output to actuating means for changing the acceleration, and thereby the speed of device 26.

INDUSTRIAL APPLICABILITY

Figure 5:
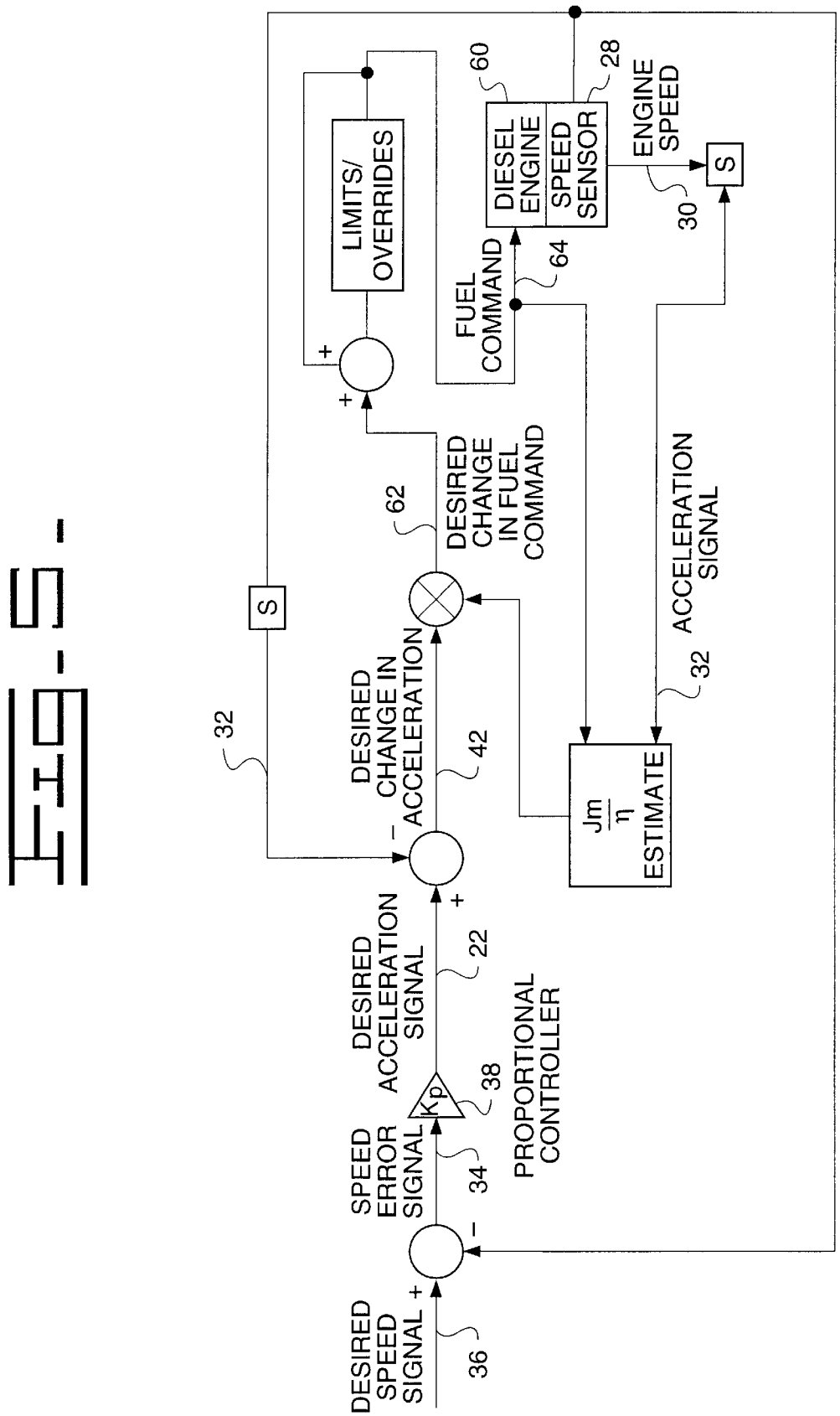
FIG. 5 is a functional block diagram of a speed control system incorporating the present acceleration based speed governor for a diesel engine.
Figure 6:
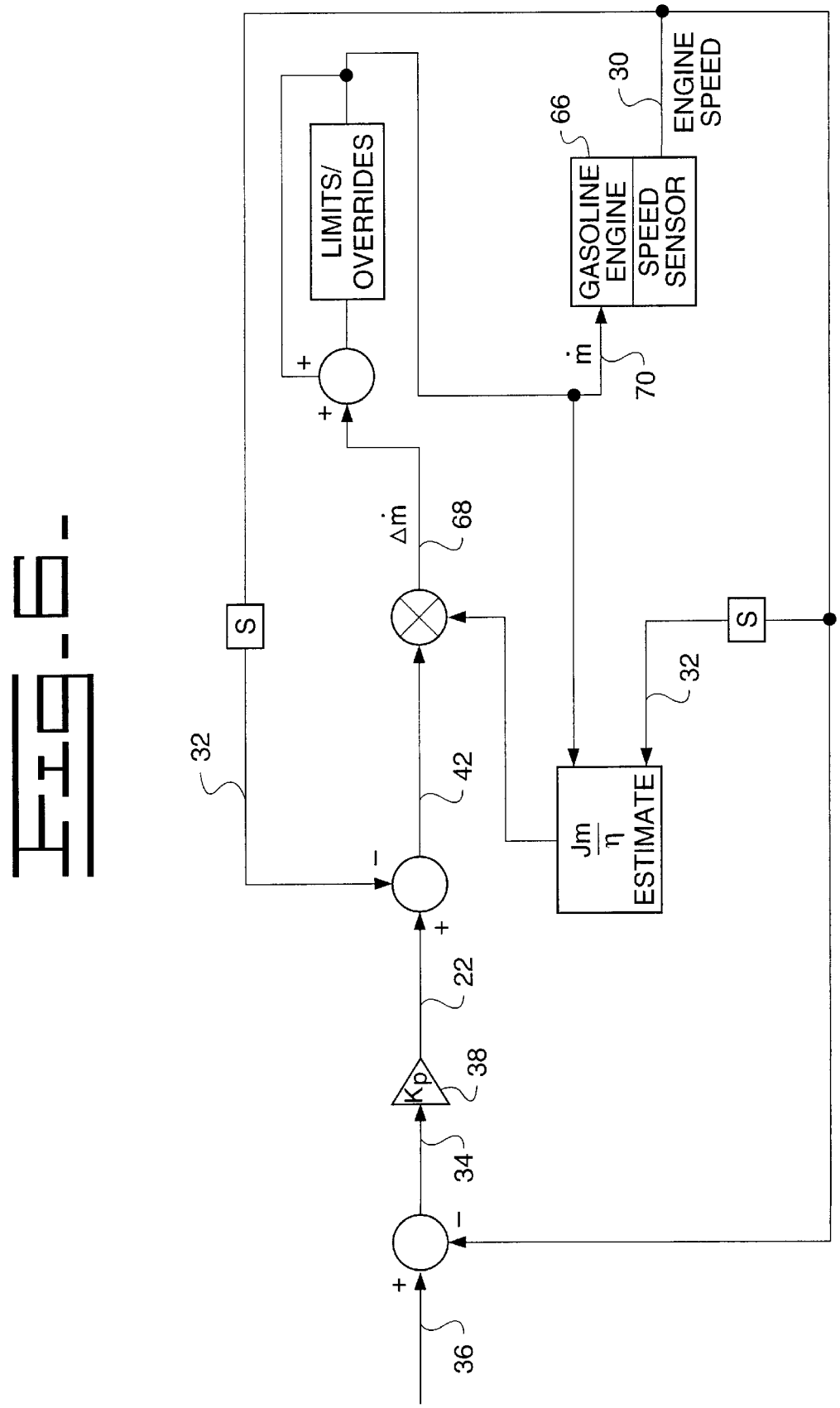
FIG. 6 is a functional block diagram of a speed control system incorporating the present acceleration based speed governor for a gasoline engine.

The present invention provides an alternative speed governing system for devices, such as combustion engines, that may be applied across a range of products with minimal change in gain factors and feedback loops. The present speed governing system is based on acceleration feedback rather than feedback from speed, which reduces compensation latency associated with other speed governors. The present invention allows a user to achieve the desired response to speed errors by selecting an appropriate conversion from speed error signal 34 to desired acceleration signal 22. The governor's response to desired changes in acceleration 42 can be defined as a constant by linking speed error 34 to desired acceleration 22 as follows:

$$\alpha_{desired} = speed_{error} * \tau$$

Where $\tau$ is the inverse time constant of the system. For example, if speed is expressed in revolutions per minute (rpm), $\tau=0.01$ will correct acceleration at the rate of 100 rpm per second. In FIGS. 3, 5, and 6, the conversion means is shown as a proportional controller $K_p$, where $K_p=\tau$, however, the conversion may be a more complex function to achieve the desired response from the engine.

FIG. 5 shows an example of an application of the present invention to diesel engine 60 wherein a desired change in fuel command 62 is computed using desired change in acceleration signal 42 and inertial gain factor $J_m/\eta$. Fuel command 64 represents a desired fuel flow to diesel engine 60. The fuel delivered to diesel engine 60 is converted to torque as a result of the combustion cycle. Variation in conversion efficiency is taken into account in gain factor $J_m/\eta$, where $\eta$ represents conversion efficiency. Knowledge of change in acceleration achieved with a past change in fuel command 62 is used to compute inertial gain factor $J_m/\eta$ at selected intervals based on the assertion that acceleration of diesel engine 60 is a function of torque as defined by the following equation:

$$\alpha = (F*\eta - T)/J_m$$

Where:
$\alpha$=acceleration signal 32
F=fuel command signal 64
$\eta$=efficiency in converting fuel command signal 64 to torque
T=torque applied to a load
$J_m$=moment of inertia of diesel engine 60 and the machine powered by the diesel engine, if applicable A change in acceleration between subsequent passes is therefore equal to:

$$\Delta\alpha = \alpha_{i-1}\alpha_{i-2} = (F_{i-1}*\eta - T_{i-1})/J_m - (F_{i-2}*\eta - T_{i-2})/J_m$$

where subscript i-1 denotes the last pass and subscript i-2 denotes the second last pass. Assuming negligible change between $T_{i-1}$ and $T_{i-2}$ due to a small time slice between subsequent data processing cycles with a digital computer system, the equation reduces to:

$$\Delta\alpha = \eta*(F_{i-1}-F_{i-2})/J_m = \eta*\Delta F/J_m$$

Therefore, $$\Delta F = \Delta\alpha * J_m/\eta$$

and $$J_m/\eta = \Delta F/\Delta\alpha$$

An estimate of inertia over conversion efficiency ($J_m/\eta$) is thus computed using values of F and $\alpha$ from previous data processing cycles. The desired change in fuel command 62 for the present pass is then computed by multiplying the desired change in acceleration 42 by the estimate for $J_m/\eta$, as shown in FIG. 5. The fuel command signal 64 is computed by summation of the desired change in fuel command 62 with the fuel command signal 64 with the resultant signal being compared against operating conditions of the diesel engine 60.

FIG. 6 shows an example of an application of the present invention to gasoline engine 66 wherein the torque delivered by the engine is proportional to a fuel to air mixture that is delivered to the cylinders. The amount of fuel provided to the engine is proportional to the airflow. Desired change in airflow 68 is computed using desired change in acceleration signal 42 and inertia gain factor $J_m/\eta$. The fuel to air mixture delivered to gasoline engine 66 is converted to torque as a result of the combustion cycle. Variation in conversion efficiency is taken into account in gain factor $J_m/\eta$, where $\eta$ represents conversion efficiency. Knowledge of change in acceleration achieved with a past change in airflow command 68 is used to compute inertial gain factor $J_m/\eta$ at selected intervals based on the assumption that acceleration of gasoline engine 66 is a function of torque as defined by the following equation:

$$\alpha = (m'*\eta - T)/J_m$$

Where:
$\alpha$=acceleration signal 32
m'=airflow command signal 70
$\eta$=efficiency in converting airflow command signal 70 to torque
T=torque applied to a load
$J_m$=moment of inertia of gasoline engine 66 and the machine powered by the gasoline engine, if applicable A change in acceleration between subsequent passes is therefore equal to:

$$\Delta\alpha = \alpha_{i-1} - \alpha_{i-2} = (m'_{i-1}*\eta - T_{i-1})/J_m - (m'_{i-2}*\eta - T_{i-2})/J_m$$

where subscript i-1 denotes the last pass and subscript i-2 denotes the second last pass. Assuming negligible change between $T_{i-1}$ and $T_{i-2}$ due to a small time slice between subsequent data processing cycles with a digital computer system, the equation reduces to:

$$\Delta\alpha = \eta*(m'_{i-1} - m'_{i-2})/J_m = \eta*\Delta m'/J_m$$

Therefore, $$\Delta m' = \Delta\alpha * J_m/\eta$$

and $$J_m/\eta = \Delta m'/\Delta\alpha$$

An estimate of inertia over conversion efficiency ($J_m/\eta$) is thus computed using values of m' and $\alpha$ from previous data processing cycles. The desired change in airflow command 68 for the present pass is then computed by multiplying the desired change in acceleration 42 by the estimate for $J_m/\eta$, as shown in FIG. 6. Airflow command signal 70 is computed by summing the desired change in airflow command 68 with the airflow command signal 70 and then comparing the resultant signal against predetermined or preestablished operating conditions of the gasoline engine 66.

The present invention is also applicable to dual fuel engines which operate in two modes. In a strictly liquid fuel mode a liquid fuel, such as diesel fuel, is injected directly into the engine cylinders or precombustion chambers as the sole source of energy during combustion. In a dual fuel mode a gaseous fuel, such as natural gas, is mixed with air in intake ports of the cylinders and a small amount of diesel fuel is injected into the cylinders or the precombustion chambers in order to ignite the mixture of air and gaseous fuel. Speed governors are typically used to control the speed of the dual fuel engine and the present invention may be implemented to command fuel flow as shown in FIG. 5 during the liquid fuel mode, and to command air flow as shown in FIG. 6 during the dual fuel mode.

The present invention is useful in other applications where a speed governor is required, and there is a correlation between acceleration and the output of the device being controlled. In controlling the speed of engines, there is a correlation between acceleration and the torque delivered by the engine, which is also proportional to the fuel flow and/or the airflow.

What is claimed is:

1. A method for governing the speed of a device comprising:
    (a) determining a desired change in acceleration;
    (b) determining a desired change in a first command signal based on the desired change in acceleration, the inertia of the device, and a load associated with the device;
    (c) determining a second command signal based on the desired change in the first command signal; and
    (d) outputting the second command signal to actuating means for changing the speed of the device.

2. The method, as set forth in claim 1, wherein the device is a movable machine powered by an engine.

3. The method, as set forth in claim 1, wherein the device is a movable component of a machine.

4. The method, as set forth in claim 1, wherein the device is a diesel engine.

5. The method, as set forth in claim 4, wherein the second command signal represents a desired fuel flow to the diesel engine.

6. The method, as set forth in claim 1, wherein the device is a gasoline engine.

7. The method, as set forth in claim 6, wherein the second command signal represents a desired air flow to the gasoline engine.

8. The method, as set forth in claim 1, wherein the device is a dual fuel engine.

9. The method, as set forth in claim 8, wherein the command signal represents a desired air flow to the dual fuel engine.

10. The method, as set forth in claim 8, wherein the command signal represents a desired fuel flow to the dual fuel engine.

11. A method for governing the speed of a device comprising:
    (a) sensing the speed of the device;
    (b) calculating the acceleration of the device based on the current speed of the device and a previous speed of the device;
    (c) determining a desired change in acceleration based on the difference between a desired acceleration of the device and the calculated acceleration of the device;
    (d) determining an inertial gain factor based on a previous command signal, a previous speed of the device, and the sensed speed of the device; and
    (e) calculating a desired change in a command signal based on the desired change in acceleration and the inertial gain factor.

12. The method, as set forth in claim 11, further comprising the step of:
    (f) determining a command signal based on the previous command signal and the desired change in the command signal and whether the command signal is within certain operating conditions of the device.

13. A method for governing the speed of a device comprising:
    (a) determining a speed error signal based on the difference between the desired speed of the device and the speed of the device;
    (b) converting the speed error signal to a desired acceleration signal using a proportional controller;
    (c) determining a desired change in acceleration based on the difference between the desired acceleration of the device and the actual acceleration of the device;
    (d) determining an inertial gain factor based on a previous command signal and the change in the speed of the device; and
    (e) calculating a desired change in the command signal by multiplying the desired change in acceleration by the inertial gain factor.

14. The method, as set forth in claim 13, further comprising:
    (f) determining a command signal based on the previous command signal and the desired change in the command signal and whether the command signal is within certain operating conditions of the device.

15. An apparatus for governing the speed of a device including a speed sensor for providing a speed signal indicative of the speed of a component of the device, the apparatus comprising:
    data processing means operable to:
        (a) determine a desired change in acceleration;
        (b) determine a desired change in a command signal based on the desired change in acceleration, the inertia of the device, and a load associated with the device; and
        (c) determine a command signal based on the desired change in the command signal and a previous command signal.

16. The apparatus, as set forth in claim 15 wherein the command signal is output to actuating means for changing the speed of the device.

17. The apparatus, as set forth in claim 15, wherein the device is a movable machine powered by an engine.

18. The apparatus, as set forth in claim 15, wherein the device is movable component of a machine.

19. The apparatus, as set forth in claim 15, wherein the device is a diesel engine.

20. The apparatus, as set forth in claim 19, wherein the command signal represents a desired fuel flow to the diesel engine.

21. The apparatus, as set forth in claim 15, wherein the device is a gasoline engine.

22. The apparatus, as set forth in claim 18, wherein the command signal represents a desired air flow to the gasoline engine.

23. The apparatus, as set forth in claim 15, wherein the device is a dual fuel engine.

24. The apparatus, as set forth in claim 23, wherein the command signal represents a desired air flow to the dual fuel engine.

25. The apparatus, as set forth in claim 23, wherein the command signal represents a desired fuel flow to the dual fuel engine.

* * * * *